(12) United States Patent
Krummel (10) Patent No.: US 9,295,121 B2
(45) Date of Patent: Mar. 22, 2016

(54) CIRCUIT ARRANGEMENT AND METHOD FOR OPERATING AND DIMMING AT LEAST ONE LED

(71) Applicant: OSRAM GmbH, Munich (DE)

(72) Inventor: Peter Krummel, Traunreut (DE)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/763,838

(22) PCT Filed: Dec. 19, 2013

(86) PCT No.: PCT/EP2013/077474
§ 371 (c)(1),
(2) Date: Jul. 28, 2015

(87) PCT Pub. No.: WO2014/117905
PCT Pub. Date: Aug. 7, 2014

(65) Prior Publication Data
US 2015/0366015 A1     Dec. 17, 2015

(30) Foreign Application Priority Data

Jan. 29, 2013 (DE) .......................... 10 2013 201 438

(51) Int. Cl.
*H05B 37/02* (2006.01)
*H05B 33/08* (2006.01)

(52) U.S. Cl.
CPC ........ *H05B 33/0815* (2013.01); *H05B 33/0845* (2013.01); *H05B 33/0884* (2013.01)

(58) Field of Classification Search
CPC ............... H05B 33/08; H05B 33/0803; H05B 33/0815; H05B 37/029; H05B 41/28; H05B 41/2828; H05B 41/2855; H05B 41/2856; H05B 41/3924; Y02B 20/348

USPC ............ 315/209 R, 247, 244, 291, 294, 307, 315/308, 312, DIG. 4, DIG. 7
See application file for complete search history.

(56) References Cited

U.S. PATENT DOCUMENTS

| 6,933,681 B2 * | 8/2005 | Rudolph | ............... | H05B 41/28 315/219 |
| 8,203,283 B2 * | 6/2012 | Hoogzaad | .......... | H05B 33/0803 315/185 R |

(Continued)

FOREIGN PATENT DOCUMENTS

| DE | 19848925 A1 | 4/2000 |
| DE | 102005058484 A1 | 6/2007 |

OTHER PUBLICATIONS

German Search Report based on Application No. 10 2013 201 438.4 (5 pages) dated Oct. 11, 2013.

(Continued)

*Primary Examiner* — Haissa Philogene
(74) *Attorney, Agent, or Firm* — Viering, Jentschura & Partner mbB (57) ABSTRACT

Various embodiments may relate to a circuit arrangement and a method for operating and dimming at least one LED. In this case, the LEDs are supplied from a bridge arrangement, wherein, in order to dim the at least one LED, the frequency of the control signals is increased with increasing dimming until a predefinable dimming threshold value. In order to adjust dimming values which are below the predefinable dimming threshold value, the output signal of the bridge arrangement is short-circuited by means of a short-circuit device during predefinable periods.

13 Claims, 4 Drawing Sheets

(56) References Cited

U.S. PATENT DOCUMENTS

| | | |
|---|---|---|
| 2003/0122502 A1 | 7/2003 | Clauberg et al. |
| 2007/0242015 A1 | 10/2007 | Anderson et al. |
| 2009/0251065 A1 | 10/2009 | Niedermeier et al. |
| 2010/0079085 A1 | 4/2010 | Wendt et al. |
| 2012/0181940 A1 | 7/2012 | Snelten et al. |
| 2013/0147269 A1* | 6/2013 | Zimmermann ........... H02J 9/02 307/23 |
| 2014/0361698 A1* | 12/2014 | Pereira ............... H05B 33/0809 315/193 |

OTHER PUBLICATIONS

International Search Report based on Application No. PCT/EP2013/077474 (3 pages + 2 pages of English translation) dated Apr. 30, 2014.

* cited by examiner

CIRCUIT ARRANGEMENT AND METHOD FOR OPERATING AND DIMMING AT LEAST ONE LED

RELATED APPLICATIONS

The present application is a national stage entry according to 35 U.S.C. §371 of PCT application No.: PCT/EP2013/077474 filed on Dec. 19, 2013, which claims priority from German application No.: 10 2013 201 438.4 filed on Jan. 29, 2013, and is incorporated herein by reference in its entirety.

TECHNICAL FIELD

Various embodiments may relate to a circuit arrangement for operating and dimming at least one LED, including an input with a first and a second input connection for coupling to a DC supply voltage, at least one first and one second electronic switch in a bridge arrangement, wherein the first and the second electronic switches are coupled to form a bridge center point in series between the first and the second input connections, an output with a first and a second output connection for connecting the at least one LED, an inductor, a rectifier with a rectifier input and a rectifier output, wherein the inductor is coupled between the bridge center point and the rectifier input, wherein the rectifier output is coupled to the output of the circuit arrangement, and a control device with at least one first and one second output for supplying control signals to the first and the second electronic switches, wherein the control signals have a predefinable frequency, wherein the control device has an input for supplying an item of dimming information, wherein, in order to dim the at least one LED, the control device is configured to increase the frequency of the control signals with increasing dimming. Various embodiments may also relate to a corresponding method for operating and dimming at least one LED.

BACKGROUND

Various embodiments relate to the problem that LEDs should be simply and cost-effectively operated and dimmed without audible or visible impairments occurring, for example buzzing or a flickering appearance. A generic circuit arrangement for operating at least one LED and a method for the operation of same is disclosed in DE 10 2005 058 484 A1.

It is known to dim LEDs using pulse-width modulation. For pulse-width modulation, frequencies of a few hundred Hz are used. Admittedly, these are not consciously perceived by the human eye but can lead to stroboscopic and hence disturbing effects. Moreover, the low frequencies are in the range of human hearing and can therefore lead to undesired noise pollution.

SUMMARY

Various embodiments provide a generic circuit arrangement or a method mentioned at the outset such that the operation and dimming of LEDs with substantially reduced visible and/or audible disturbances is enabled.

The present disclosure is based on the discovery that although, in the case of a generic circuit arrangement, dimming can indeed be achieved by increasing the frequency, shifts in the color point occur with increasing dimming from a particular threshold value, however, which shifts in the color point can in turn be perceived by the human eye and hence lead to undesired visible disturbances.

The disclosure therefore takes the approach, in order to dim the at least one LED, of increasing the frequency of the control signals with increasing dimming only until a predefinable dimming threshold value. If the LED is to be dimmed further, that is to say even less light is to be emitted, changeover is made according to various embodiments to another procedure: for this purpose, the circuit arrangement also includes a short-circuit device having at least one input and at least one output, wherein the at least one input of the short-circuit device is coupled to at least one output of the control device, wherein the at least one output of the short-circuit device is coupled to the rectifier input, wherein the control device is also configured to activate the short-circuit device during predefinable periods in order to adjust a dimming value which is below the predefinable dimming threshold value.

In the nomenclature of the present application, increasing dimming denotes a decreasing dimming value and hence a decrease in the emitted light.

While dimming by PWM leads to audible and visible impairments, which may occur owing to the low-frequency periodic switching-on and switching-off of the current in an inductor, these are substantially reduced in the case of dimming with an increase in frequency. In the case of dimming with an increase in frequency, the current level is reduced without the flow of current in the inductor being interrupted. Therefore, no noise and stroboscopic effects occur. However, if a particular current level is undershot, the color point of the light output by the LED is changed, which in turn leads to visible impairments. As practical experiments have shown, in the case of LEDs, the color point shifts if the current is less than 20 to 30% of the nominal current. In contrast, the frequency of the current plays no role.

A generic circuit arrangement is known in principle from electronic control gear for fluorescent lamps, in particular low-pressure fluorescent lamps. For dimming, the frequency is increased, and hence the LED current is reduced, in the upper dimming range, that is to say from approximately 100% down to 20 to 30% light. The frequencies are usually above 40 kHz and are therefore not audible. For dimming, the frequency of the bridge arrangement is raised. Owing to the increase in frequency, the current supplied to the LEDs is reduced and hence the emitted light is reduced. However, in order not to negatively influence the color reproduction of an LED, dimming to less than 20 to 30% by further reducing the LED current-level by means of increasing the frequency should be avoided.

Accordingly, for dimming to values below 20 to 30%, the bridge frequency is kept constant according to various embodiments at the high level of the dimming threshold value, which is necessary in order to adjust the LED current to 20 to 30%. In this case, the frequency of the bridge arrangement is approximately 150 to 200 kHz and hence significantly above the audible range. The light current of the LEDs is henceforth further reduced by a high-frequency suppression of individual ones of the high-frequency current half-cycles. The frequency for suppression is selected to be greater than 20 kHz and is therefore above the audible range; however, it is considerably lower than the bridge frequency. By virtue of this procedure, the LED peak current level remains constant, as a result of which the color reproduction is not influenced. Different dimming levels may be set by chopping individual to multiple half-cycles per unit time. By virtue of this procedure, it is possible to dim to 0% light. All frequencies are above the frequency audible to humans. Gradation of the dimmed light can be achieved by the number of chopped current half-cycles being varied according to a predefinable scheme between individual cycles.

An embodiment is accordingly distinguished in that the frequency of the control signals for adjusting a dimming value which corresponds to the dimming threshold value is a maximum frequency value. In this way, audible and visible impairments are reliably excluded. The control device is preferably also configured to adjust the frequency control signals to the maximum frequency value in order to adjust a dimming value which is below the predefinable dimming threshold value. Hence, dimming values of up to 0% are made possible without audible or visible impairments.

The short-circuit device may include at least one series circuit including an electronic switch and at least one diode, wherein the input of the electronic switch is coupled to the further output of the control device, wherein the series circuit is coupled between the output of the short-circuit device and a reference potential. In this way, the short-circuit device can be suitably controlled by means of the control device to suppress predefinable half-cycles of the bridge current.

According to a first variant, the short-circuit device includes a first series circuit including a first electronic switch and a first diode, and a second series circuit including a second electronic switch and a second diode, wherein the first and the second series circuits are connected in parallel, wherein the first diode and the second diode are arranged with opposite orientation. In this way, it is made possible to short-circuit positive half-cycles by one of the series circuits and to short-circuit negative half-cycles by the other series circuit.

In another variant, the short-circuit device has only one electronic switch. For this purpose, it includes a first, a second, a third and a fourth diode. The first and the second diodes are coupled in series between the output of the short-circuit device and the reference potential to form a first coupling point with cathodes which are oriented toward one another, while the third and the fourth diodes are coupled in series between the output of the short-circuit device and the reference potential to form a second coupling point with anodes which are oriented toward one another. The operating electrode of the electronic switch is coupled to the first coupling point and the reference electrode of the electronic switch is coupled to the second coupling point. By virtue of the neat arrangement of the diodes, it is made possible to short-circuit positive and negative half-cycles using one and the same electronic switch.

A transformer may be coupled between the inductor and the rectifier in order to provide electrical isolation between the input and the output of the circuit arrangement.

In various embodiments, the circuit arrangement includes a current-measuring device, in particular a shunt resistor, which is configured to measure a current which correlates with the current through the at least one LED, wherein the current-measuring device is coupled to the control device in order to control the current through the at least one LED. In this way, it is possible to reliably control to a predefinable dimming value.

The circuit arrangement may also include an intermediate-circuit capacitor, which is coupled between the first and the second input connections. The circuit arrangement may also include a bridge capacitor, which is coupled between the inductor and the rectifier. Finally, a resonant capacitor may be provided, which is coupled between the connection of the inductor which is not connected to the bridge center point and the reference potential.

The embodiments presented with reference to the circuit arrangement according to various embodiments and the advantages of said embodiments correspondingly apply, insofar as they can be used, to the method according to various embodiments.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

In the following embodiments, identical reference signs are used for identical and identically acting components. For the sake of clarity, these are introduced only once.

Figure 1:
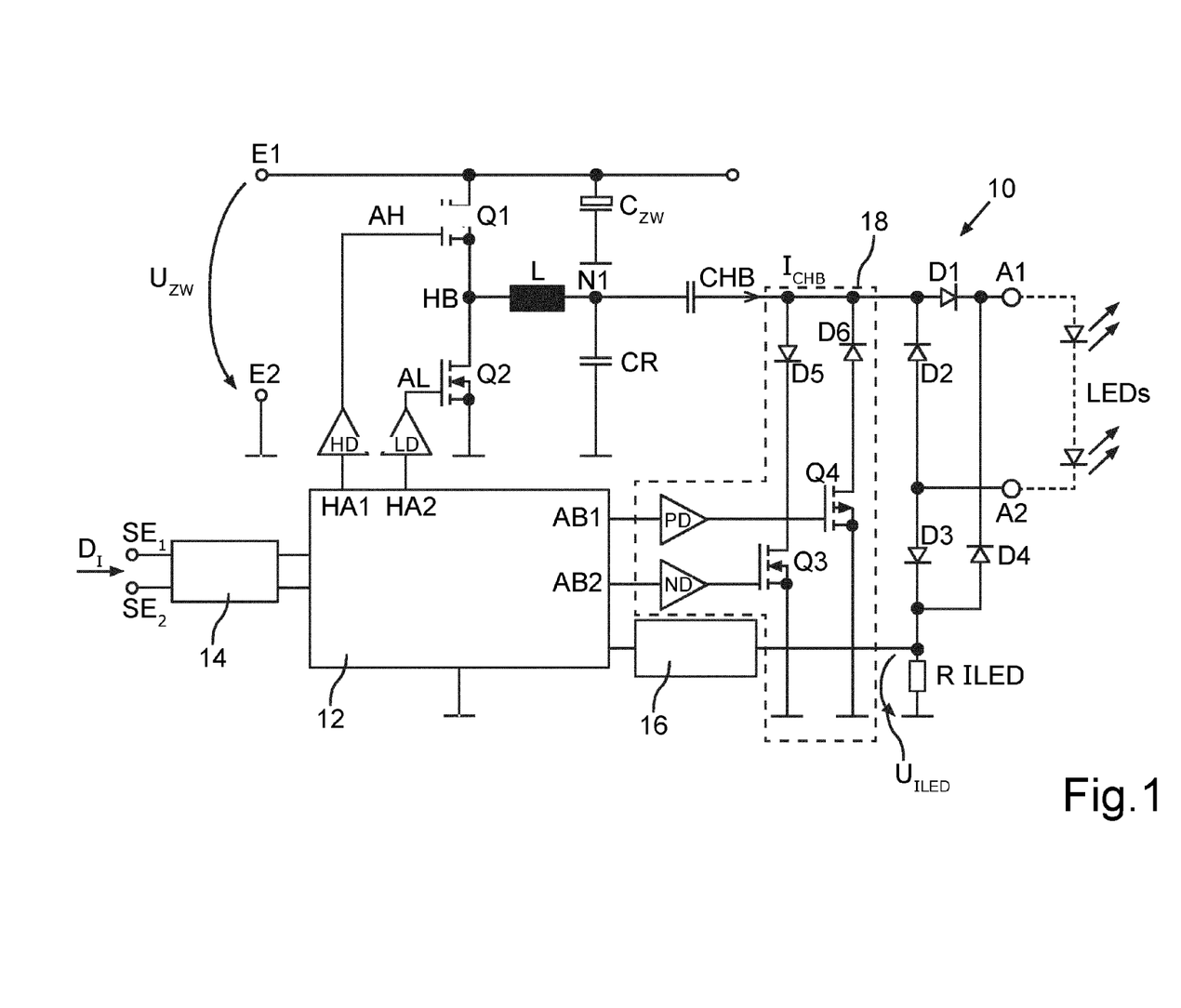
FIG. 1 shows a schematic illustration of a first exemplary embodiment of a circuit arrangement according to the present disclosure.

FIG. 1 shows a schematic illustration of a first exemplary embodiment of a circuit arrangement according to the present disclosure. This has an input with a first E1 and a second E2 input connection for coupling to a DC supply voltage, which, in the present case, represents the so-called intermediate circuit voltage $U_{Zw}$. This is preferably generated and controlled by an upstream OFC controller from an AC grid voltage and is usually in the order of magnitude of 400 V DC.

An intermediate-circuit capacitor $C_{Zw}$ is coupled between the input connections E1, E2 to buffer the intermediate circuit voltage $U_{Zw}$. The circuit arrangement also includes a first Q1 and a second Q2 transistor in a half-bridge arrangement, wherein the two transistors Q1, Q2 are coupled to form a half-bridge center point HB in series between the first and the second input connections E1, E2. As is obvious to a person skilled in the art, the present disclosure could also be implemented using a full-bridge.

The circuit arrangement also includes an output with a first and a second output connection A1, A2 for connecting at least one LED. The series circuit including an inductor L, a half-bridge capacitor CHB and a rectifier 10 is coupled between the half-bridge center point HB and the first output connection A1, wherein the rectifier includes the diodes D1, D2, D3 and D4. Since the resistance of the inductor L increases with increasing frequency, the current $I_{CHB}$ for dimming the LEDs can be reduced by increasing the frequency.

The node N1 at which the inductor L is coupled to the half-bridge capacitor CHB is connected to the reference potential via a resonant capacitor CR. A control device 12 is configured to control the transistor Q1 via a first output HA1 and to control the transistor Q2 via a second output HA2. A high-side driver HD, which is also used as a level shifter, is coupled between the output HA1 and the control electrode of the transistor Q1, while a low-side driver LD is coupled between the output HA2 and the control electrode of the transistor Q2.

The control device 12 is coupled to an interface 14 via the inputs SE1, SE2 of which an item of dimming information $D_I$ can be supplied to the control device 12. The interface 14 can be, in particular, a DALI interface or a so-called 1-10-volt interface. A shunt resistor $R_{ILED}$ is coupled between the rectifier 10 and the reference potential, wherein the voltage $U_{ILED}$ dropping across the resistor $R_{ILED}$ is coupled to the control device 12 via a matching circuit 16. The matching circuit 16 is designed to generate from the voltage $U_{ILED}$ a measured signal which is proportional to the current through the LEDs, which measured signal can be processed by the control device 12.

The control device 12 is preferably embodied as a microcontroller. As is obvious to a person skilled in the art, the current $I_{CHB}$ flowing through the capacitor CHB is an alternating current, that is to say it is composed of positive and negative half-cycles.

The control signals AH, AL for the transistors Q1, Q2 are square waves at a variable frequency $f_{HB}$. The control device 12 is then configured, in the case of increasing dimming, that is to say in the case of increasing reduction of the light to be output by the LEDs, to increase the frequency $f_{HB}$ to a predefinable threshold value SW. The frequency $f_{HBmax}$ at the threshold value SW is a maximum frequency value which is not exceeded according to the present disclosure. The threshold value SW is preferably between 20 and 30% of the maximum light output by the LEDs. The frequency $f_{HB}$, is, for example, 40 kHz in the undimmed state. The frequency $f_{HBmax}$ at the dimming threshold value SW is, for example, between 150 and 200 kHz.

In order to adjust dimming values which are below the dimming threshold value SW, that is to say with further increasing dimming, the following is performed: for this purpose, the circuit arrangement has a first series circuit including a diode D5 and a transistor Q3, and a second series circuit coupled in parallel with said first series circuit and including a diode D6 and a transistor Q4. As can clearly be seen, the diodes D5 and D6 are oriented differently, while the transistors Q3 and Q4 are embodied in a complementary manner. The control device 12 has two further outputs, to be more precise an output AB1, which is coupled to the control electrode of the transistor Q4 via a driver PD, and an output AB2, which is coupled to the control electrode of the transistor Q3 via a driver ND. The series circuits D5 and Q3, and D6 and Q4, form a short-circuit device 18.

If the transistor Q3 is switched by means of the output signal AB2 so as to conduct at the instant at which the current $I_{CHB}$ has a positive half-cycle, the corresponding half-cycle is short-circuited and therefore is missing from the input signal to the rectifier 10. As a result of the fact that the diode D6 is oriented oppositely to the diode D5, the series circuit composed of the diode D6 and the transistor Q4 does not influence this phase. If, conversely, the transistor Q4 is switched by means of the output signal AB1 so as to conduct at an instant at which the current $I_{CHB}$ has a negative half-cycle, the corresponding half-cycle is short-circuited and therefore is missing from the output signal provided at the rectifier 10. The series circuit composed of the diode D5 and the transistor Q3 then does not influence this phase.

In order, for example, to short-circuit every tenth positive and every tenth negative half-cycle by appropriate control of the transistors Q3 and Q4 by means of the output signals AB1 and AB2, that is to say to suppress said half-cycles, the transistors Q3 and Q4 are accordingly controlled by a signal which has a frequency of 20 kHz. This frequency is above the audible range and therefore does not lead to any audible disturbances. For further dimming, for example, instead of the suppression of every tenth half-cycle, for example, n successive half-cycles can be short-circuited, wherein n is between 1 and 10. As is obvious to a person skilled in the art, the dimming level can likewise be varied by short-circuiting every nth half-cycle. If, for example, signals at 40 kHz are provided at the outputs AB1, AB2, then every fifth oscillation can be suppressed at an $f_{HBmax}$ of 200 kHz. Fine gradation of the dimming level can be achieved by the number of chopped current half-cycles between individual 20 kHz-cycles being varied according to a predefinable scheme.

While the circuit arrangement would, in principle, manage with one series circuit composed of a switch and a diode, for example the series circuit D5 and Q3 or the series circuit D6 and Q4, particularly finely adjustable dimming levels can be achieved if both of said series circuits are present, as shown in FIG. 1.

What is particularly advantageous in the embodiment shown in FIG. 1 is the fact that the switches Q3, Q4 can be controlled on the basis of an internal ground. Hence, the drivers PD and ND can be realized in a particularly simple and cost-effective manner. It is likewise advantageous that the switches Q3, Q4 can always be switched into the current-free state, that is to say when the associated diode is in the blocking direction. Hence, the control is simple and not time-critical. This results in a particularly low power loss and in the avoidance of EMC disturbances.

Figure 2:
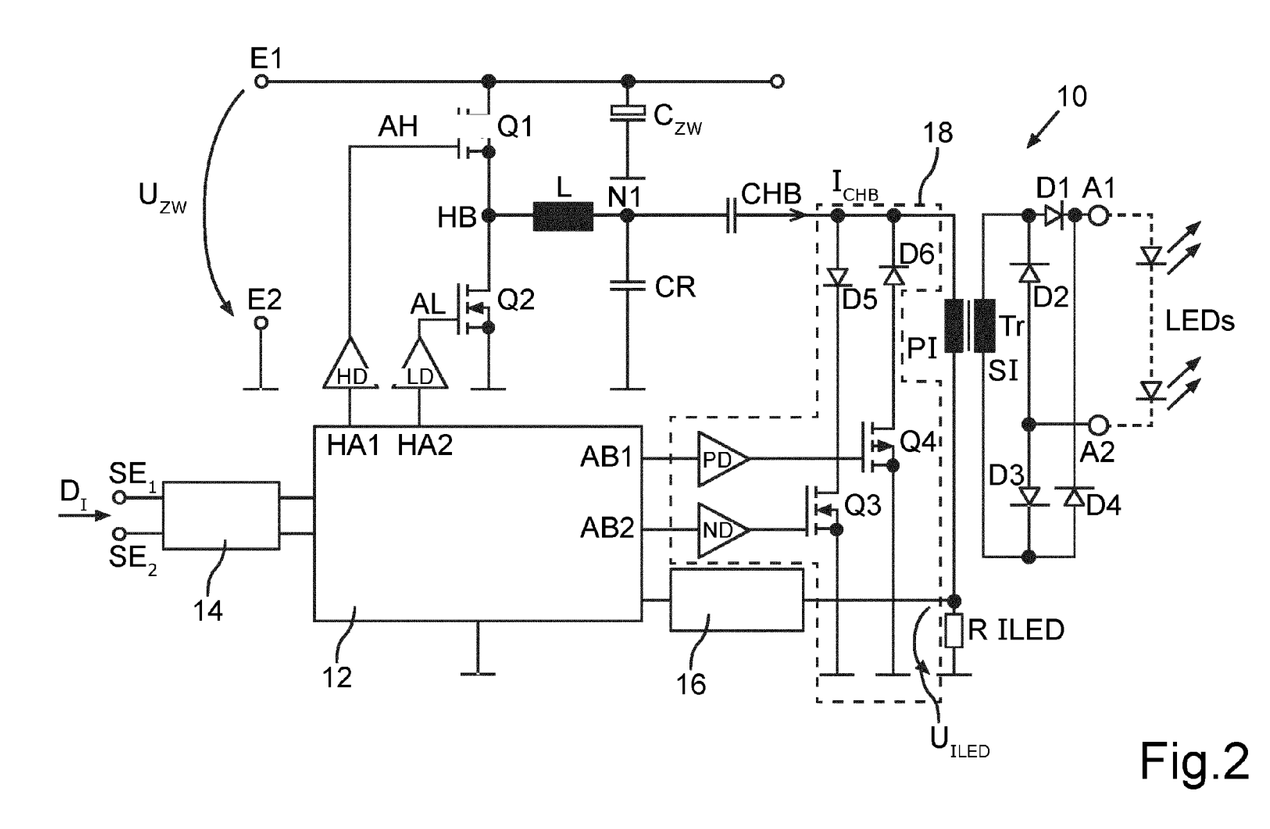
FIG. 2 shows a schematic illustration of a second exemplary embodiment of a circuit arrangement according to the present disclosure.

The embodiment illustrated in FIG. 2 differs from that illustrated in FIG. 1 in that the output circuit is electrically isolated from the input circuit using a transformer Tr. In this case, a series circuit, which includes the primary inductance PI and the shunt resistor $R_{ILED}$, is coupled in parallel with the series circuits D5 and Q3, and D6 and Q4. The secondary inductance SI is coupled to the input of the rectifier 10. Owing to the fact that a transformer Tr is used in the case of the embodiment according to FIG. 2, care should be taken that the positive and negative half-cycles are alternately short-circuited, so that the transformer does not saturate. In other words, this means that the average value of the integral of the current of the primary winding PI must be zero. Accordingly, both series circuits, that is to say Q3 and D5, and Q4 and D6, must be provided.

Figure 3:
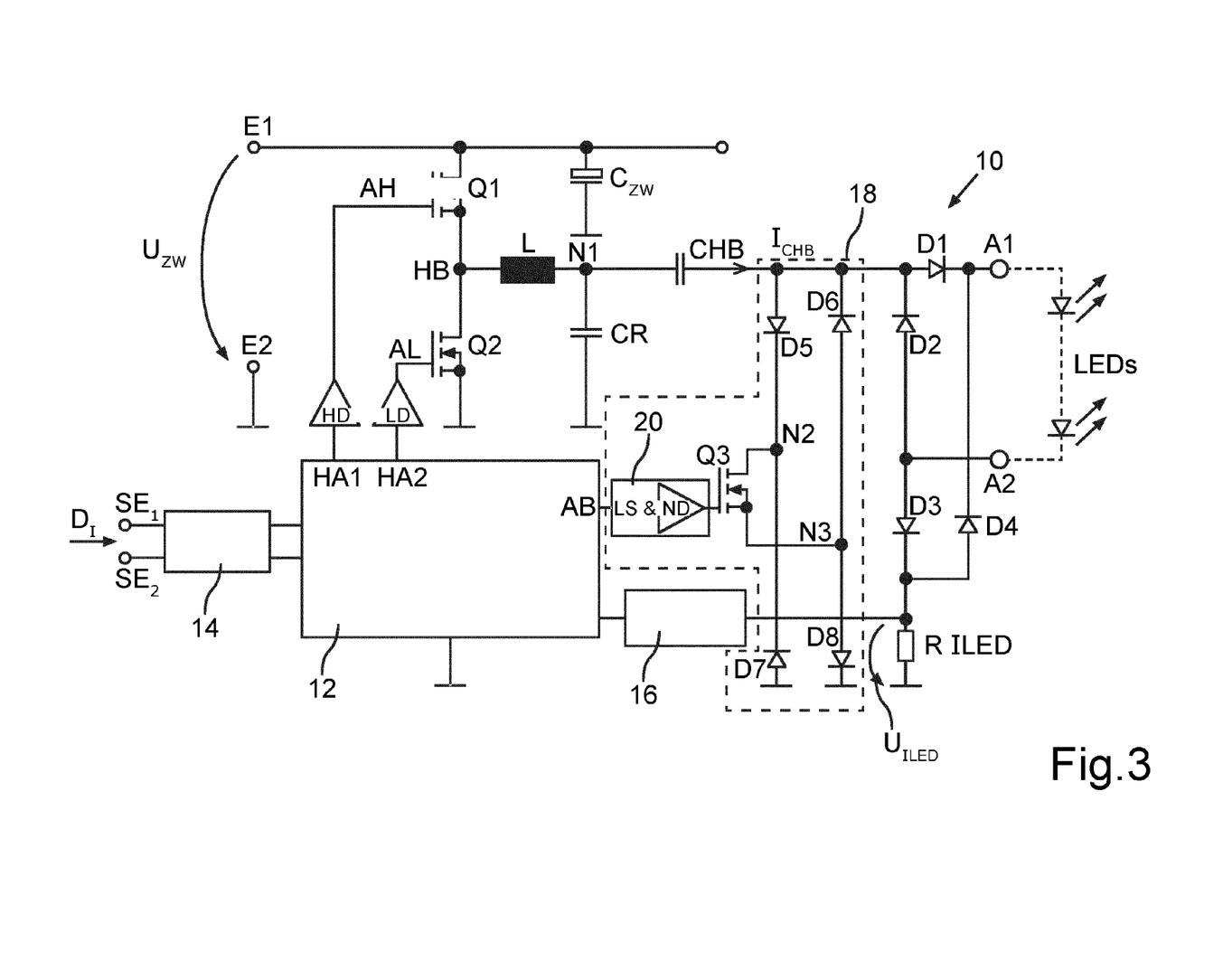
FIG. 3 shows a schematic illustration of a third exemplary embodiment of a circuit arrangement according to the present disclosure.

In the embodiment illustrated in FIG. 3, in comparison to the embodiment illustrated in FIG. 1, only one switch, namely the switch Q3, is provided for short-circuiting of half-cycles of the current $I_{CHB}$. However, two further diodes D7 and D8 have been added. As can be seen in FIG. 3, the diode D7 is coupled back-to-back in series with the diode D5, while the diode D8 is coupled back-to-back in series with the diode D6. The coupling point of the diode D5 and the diode D7 is denoted by N2, while the coupling point of the diode D6 and the diode D8 is denoted by N3. Whereas the control electrode of the switch Q3 is coupled to the output AB of the control device 12 via a driver 20, the operating or reference electrode of the switch Q3 is coupled to the node N2 or the node N3. The driver 20 is also used as level shifter for the switch Q3. The level shifter is therefore necessary as the switch connections vary in potential. In comparison to the embodiments according to FIG. 1 and FIG. 2, the control signal for the embodiment according to FIG. 3 is to be generated in a more complex and precise manner since the switch Q3 should only be switched on if the capacitor CR has already discharged. Otherwise, switching losses and increased radio interference occur. However, as discussed, a switch can be omitted.

Figure 4:
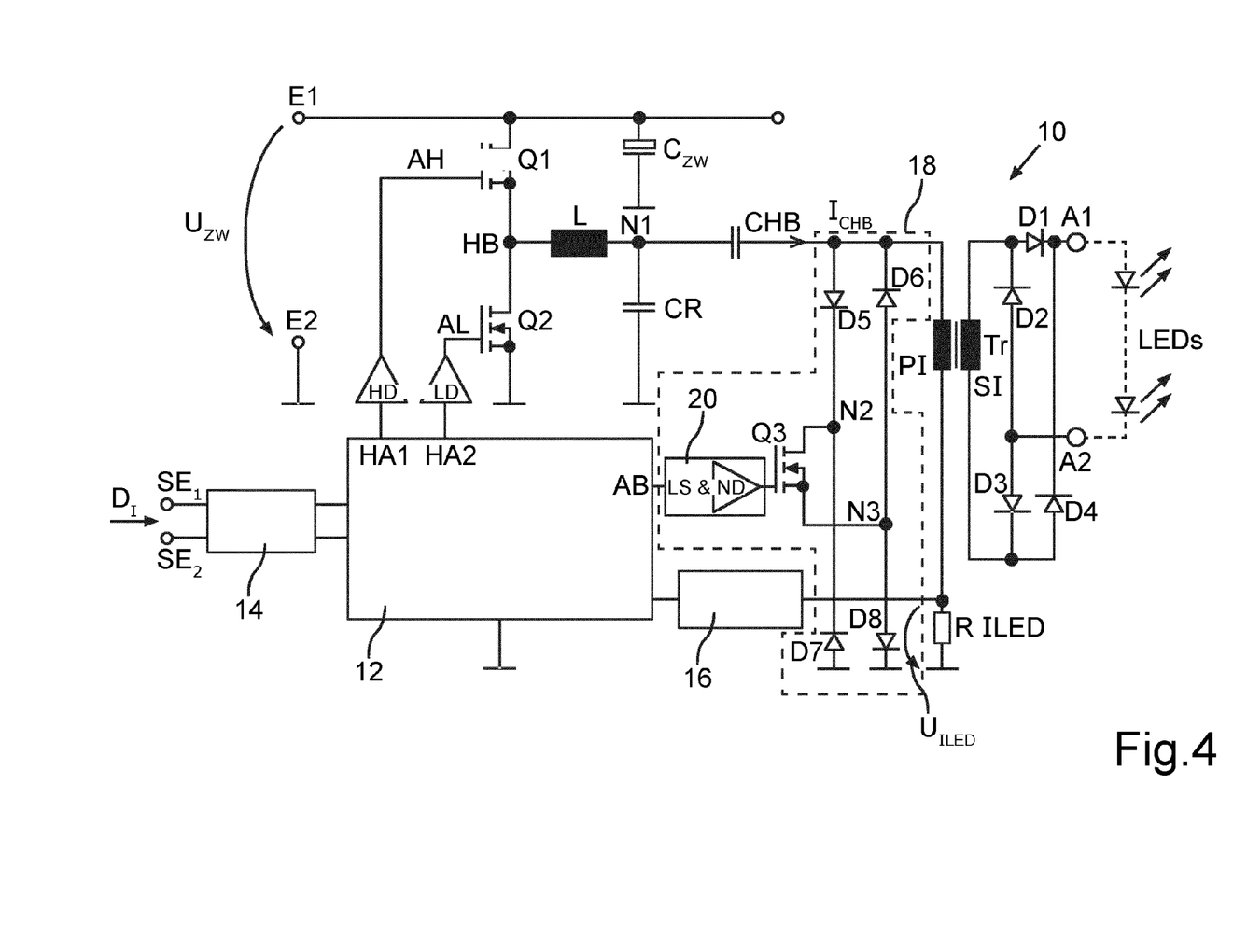
FIG. 4 shows a schematic illustration of a fourth exemplary embodiment of a circuit arrangement according to the present disclosure.

FIG. 4 shows a modification to the exemplary embodiment of FIG. 3, wherein a transformer Tr, cf. FIG. 2, is again used to electrically isolate input and output circuit. In this connection, care should again be taken that positive and negative half-cycles are alternately suppressed in order to avoid saturation of the primary inductance PI.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A circuit arrangement for operating and dimming at least one LED, comprising:
   an input with a first and a second input connection for coupling to a DC supply voltage;
   at least one first and one second electronic switch in a bridge arrangement, wherein the first and the second electronic switches are coupled to form a bridge center point in series between the first and the second input connections;
   an output with a first and a second output connection for connecting the at least one LED;
   an inductor;
   a rectifier with a rectifier input and a rectifier output, wherein the inductor is coupled between the bridge center point and the rectifier input, wherein the rectifier output is coupled to the output of the circuit arrangement; and
   a control device with at least one first and one second output for supplying corresponding control signals to the first and the second electronic switches, wherein the control signals have a predefinable frequency, wherein the control device has an input for supplying an item of dimming information, wherein, in order to dim the at least one LED, the control device is configured to increase the frequency of the control signals with increasing dimming, wherein increasing dimming denotes a decreasing dimming value and hence a decrease in the emitted light;
   wherein, in order to dim the at least one LED, the control device is designed to increase the frequency of the corresponding control signals with increasing dimming until a predefinable dimming threshold value,
   wherein the circuit arrangement also includes a short-circuit device for short-circuiting an output signal of the bridge arrangement during predefinable periods, said short-circuit device having at least one input and at least one output, wherein the at least one input of the short-circuit device is coupled to at least one further output of the control device, wherein the at least one output of the short-circuit device is coupled to the rectifier input,
   wherein the control device is also configured to activate the short-circuit device during the predefinable periods in order to adjust any dimming value which is below the predefinable dimming threshold value.

2. The circuit arrangement as claimed in claim 1, wherein the frequency of the control signals for adjusting a dimming value which corresponds to the dimming threshold value is a maximum frequency value.

3. The circuit arrangement as claimed in claim 2, wherein the control device is also configured to adjust the frequency of the control signals to the maximum frequency value in order to adjust any dimming value which is below the predefinable dimming threshold value.

4. The circuit arrangement as claimed in claim 1, wherein the short-circuit device comprises at least one series circuit comprising an electronic switch and at least one diode, wherein the input of the electronic switch is coupled to the further output of the control device, wherein the series circuit is coupled between the output of the short-circuit device and a reference potential.

5. The circuit arrangement as claimed in claim 4, wherein the short-circuit device, in addition to the first series circuit comprising a first electronic switch and a first diode, comprises a second series circuit comprising a second electronic switch and a second diode, wherein the first and the second series circuits are connected in parallel, wherein the first diode and the second diode are arranged with opposite orientation.

6. The circuit arrangement as claimed in claim 4, wherein the short-circuit device, in addition to the electronic switch and the first diode, comprises a second, a third and a fourth diode,
   wherein the first and the second diodes are coupled in series between the output of the short-circuit device and the reference potential to form a first coupling point with cathodes which are oriented toward one another,
   wherein the third and the fourth diodes are coupled in series between the output of the short-circuit device and the reference potential to form a second coupling point with anodes which are oriented toward one another,
   wherein the operating electrode of the electronic switch is coupled to the first coupling point and the reference electrode of the electronic switch is coupled to the second coupling point.

7. The circuit arrangement as claimed in claim 1, further comprising a transformer, which is coupled between the inductor and the rectifier.

8. The circuit arrangement as claimed in claim 1, further comprising a current-measuring device, which is configured to measure a current which correlates with the current through the at least one LED, wherein the current-measuring device is coupled to the control device in order to control the current through the at least one LED.

9. The circuit arrangement as claimed in claim 1, further comprising an intermediate-circuit capacitor, which is coupled between the first and the second input connections.

10. The circuit arrangement as claimed in claim 1, further comprising a bridge capacitor, which is coupled between the inductor and the rectifier.

11. The circuit arrangement as claimed in claim 4, further comprising a resonant capacitor, which is coupled between the connection of the inductor which is not connected to the bridge center point and the reference potential.

12. The circuit arrangement as claimed in claim 8, wherein the current-measuring device is a shunt resistor.

13. A method for operating and dimming at least one LED using a circuit arrangement, comprising:
   coupling a DC supply voltage to an input with a first and a second input connection;
   providing a first and a second electronic switch in a bridge arrangement, wherein the first and the second electronic switches are coupled to form a bridge center point in series between the first and the second input connection, an output with a first and a second output connection for connecting the at least one LED, an inductor, a rectifier with a rectifier input and a rectifier output, wherein the inductor couples the bridge center point and the rectifier input, wherein the rectifier output couples the output of the circuit arrangement; supplying corresponding control signals, which have a predefinable frequency to the first and the second electronic switches by means of a control device with at least one first and second output; and supplying an item of dimming information to the control device via an input, wherein, in order to dim the at least one LED, the frequency of the control signals is increased by the control device with increasing dimming, wherein increasing dimming denotes a decreasing dimming value and hence a decrease in the emitted light;

wherein, in order to dim the at least one LED, the frequency of the corresponding control signals is increased with increasing dimming until a predefinable dimming threshold value, and wherein an output signal of the bridge arrangement is short-circuited during predefinable periods in order to adjust any dimming value which is below the predefinable dimming threshold value.

* * * * *